United States Patent

[11] 3,595,350

| [72] | Inventor | Donald Wiebe<br>Sewickley, Pa. |
|---|---|---|
| [21] | Appl. No. | 857,274 |
| [22] | Filed | Aug. 22, 1969 |
| [45] | Patented | July 27, 1971 |
| [73] | Assignee | A. Stucki Company<br>Pittsburgh, Pa.<br>Continuation-in-part of application Ser. No.<br>709,142, Feb. 28, 1968, now abandoned. |

[54] SNUBBER DEVICE AND BEARING STRUCTURE THEREFORE
9 Claims, 12 Drawing Figs.

[52] U.S. Cl. ............................................. 188/321,
105/197 D, 188/322, 308/2 R
[51] Int. Cl. ............................................. F16f 9/32

[50] Field of Search............................................. 188/88.5,
100; 105/197 A, 197 B, 197 C, 197 D; 308/2

[56] References Cited
UNITED STATES PATENTS

| 844,440 | 2/1907 | Braun et al. ................... | 308/2 |
|---|---|---|---|
| 3,073,562 | 1/1963 | Tebb et al. ..................... | 248/354 |
| 3,464,366 | 9/1969 | Seay............................. | 105/197 |

*Primary Examiner*—George E. A. Halvosa
*Attorney*—E. Wallace Breisch

ABSTRACT: A hydraulic snubber device for railroad car trucks to be interposed between a bolster end and side frame member. This device provides for mounting in compression only between center seeking concave-convex pairs of mating bearing portions to prevent edge contacts with high unit bearing stresses as found in prior art flat bearing surfaces.

INVENTOR.
Donald Wiebe.

INVENTOR.
Donald Wiebe.

SNUBBER DEVICE AND BEARING STRUCTURE THEREFORE

This application is a continuation-in-part of application Ser. No. 709,142 filed Feb. 28, 1968, now abandoned.

The structure of the present invention is similar to that of my copending application Ser. No. 579,709 filed Sept. 15, 1966 and has the similar advantages of selective rate of energy absorption but is an improvement upon that structure in that partially cylindrical reaction surfaces of this invention provide for relative lateral motion between a car truck side frame and bolster and maintains sufficient uniform bearing area to preclude high unit bearing stresses such as the edge contact effect of flat mating bearing surfaces upon each other.

The structure of the present invention employs the same or similar structure to achieve "dead band operation" as described in the earlier application.

The structure of this invention however further provides an external reservoir for hydraulic fluid which cooperates with the snubber cylinder space to virtually eliminate the dead space for ullage volume normally necessary, at the top, within a closed hydraulic cylinder to provide for the volume of hydraulic liquid displaced by the piston rod when the piston is forced to the bottom of the cylinder. In the structure of this invention the external reservoir provides the ullage volume necessary for the operation of the piston within the cylinder so that the cylinder can be designed to operate effectively over its full stroke, with practically zero ullage volume within the cylinder.

It is therefore an object of this invention to provide a new and improved side frame snubber designed to operate at full efficiency as an energy absorbing structure throughout the full stroke of the piston within the cylinder.

It is a further object of this invention to provide a new and improved side frame snubber having partially cylindrical bearing surfaces designed to accommodate a limited amount of lateral motion of the truck members relative to each other without overstressing any part of the bearing surfaces.

These and other objects and advantages of the snubber of this invention will become more readily apparent upon consideration of the following description and drawings in which.

Figure 3:
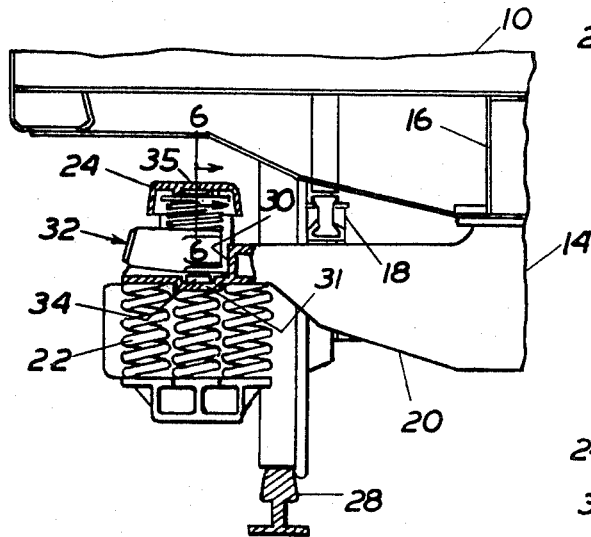
FIG. 3 is a fragmentary partially sectional and elevational view of a freight car body and truck incorporating the snubber of this invention.
Figure 4:
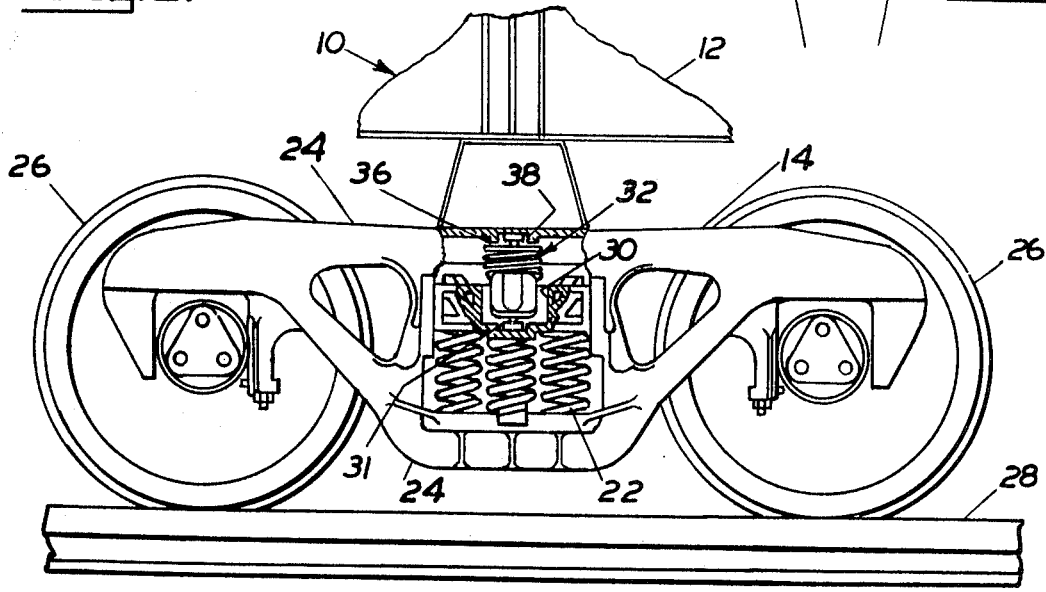
FIG. 4 is a side elevational, partially sectional, view of the structures shown in FIG. 3.

Referring now to the drawings, FIG. 4 shows a fragmentary portion of a railway car 10 comprising a freight car body 12 supported by a four-wheel truck (only one-half being shown) by way of a center plate 16 and side bearings 18 (see FIG. 3) cooperating with a bolster 20, mounted upon two sets of compression type springs 22, mounted in a pair of side frames 24 each supported by a pair of suitably journaled wheels 26 resting upon a pair of tracks 28 all as well known to those familiar with the field of railway car design.

The bolster 20 is of conventional design except that an opening 30 has been formed in each end portion of the bolster 20 to provide space for mounting a snubber 32 constructed according to the principles of this invention wherein the space 30 is similar to that found in the above cited copending application. The bottom surface of the open space 30 has a downwardly recessed portion 31 positioned centrally of the opening 30 to accept and maintain the positioning of a substantially square cup shaped lower mounting element 34 hereinafter more fully described (see FIG. 1).

Side frame 24 is likewise of conventional construction except that at a central portion of the underside of its top member there is formed a downwardly depending ring element 36 having a blind central opening of substantially square outline therein to accept, and maintain the positioning of, a generally inverted cup shaped upper mounting element 35 (hereinafter more fully described, see FIG. 1) with the snubber 32 extending between the lower mounting element 34 and the upper mounting element 35 cooperating to form a pair of bearing surfaces for the reaction imposed upon the snubber 32 by the bolster 20 and the side frame 24 as hereinafter more fully set forth.

Figure 5:
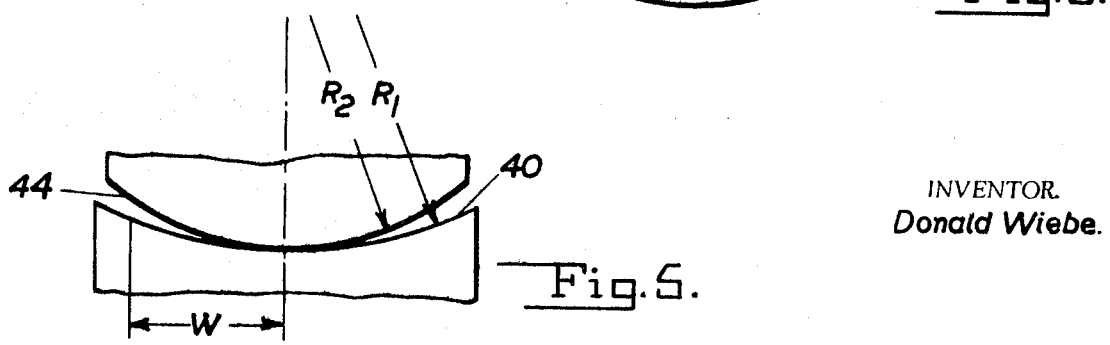
FIG. 5 is a schematic representation of a pair of partial cylindrical reaction surfaces of the snubber of FIG. 1.

As shown in FIGS. 3 and 4 the mounting elements 34 and 35, respectively, are of generally rectangular or square outline with a concave internal depression 40 of partial cylindrical form in each mounting element 34, 35 and having a radius R1 (see FIG. 5) determined as hereinafter described. The cylinder axis of each depression 40 is contained in a plane normal to the outer surface of the respective mounting element 34, 35 and also normal to opposite sides of the square outline of the respective mounting element.

Seated in and cooperating with the depression 40 of the bottom mounting element 34 is a snubber bottom member 42 of generally rectangular or square outline having a convex partially cylindrical bottom surface 44 of radius R2 (see FIG. 5) and having its cylinder axis in the same plane as that described for the concave surface of the depression 40.

The snubber 32 comprises a generally hollow cylindrical body member 48 having a central opening 49 in the bottom thereof, closely receiving and retaining in fluid tight relationship an upwardly extending cylindrical portion of the snubber bottom member 42 to form a closed bottom for the internal cylindrical surface 50 of the body member 48 wherein a suitable piston 52 is axially reciprocable. The piston 52 is rigidly secured to and movable by an upwardly extending cylindrical piston rod member 54 which extends upwardly throughout the axial length of the body member 48, through the beyond an annular cylinder closure member 56 mated to and closely received by the cylindrical surface 50 and maintained in fluid-tight relationship with the cylinder 50 and the exterior of the piston rod 54 by suitable sealing members such as O-rings 58 and U-type seals 60, respectively, or other suitable sealing elements. A lock ring 62, or other suitable retaining means, secures the cylinder closure member 56 within the cylindrical surface 50 while the piston rod 54 is maintained in slidable relationship with the central bore in the cylinder closure member 56 as is well known in the hydraulic cylinder art. Mounted on the upper end of the piston rod 54 and rigidly secured thereto as by one or more threaded retaining elements such as a cap screw 64 is an inverted cup-shaped snubber top member 66 having a convex partial cylindrical reaction surface 44 thereon of the same character and radius as the reaction surface 44 of the snubber bottom member 42 herein before described.

Abuttingly engaged with a lower surface of the exterior of the snubber top member 66 is a spring retaining cap member 68 rigidly secured by the snubber top member 66 to travel with the piston 54 in axial reciprocation. A cylindrical compression type spring 70 is engaged between the underside of the cap member 68 and an external shoulder 72 formed on the outer surface of the cylindrical body member 48 and is sufficiently compressed so that in the absence of other forces the spring 70 will extend the piston rod 54 from the body member 48 until the piston 52 contacts the bottom of the cylinder closure member 56 in a manner common to single acting hydraulic cylinders.

The piston 52 and the piston rod 54 are similar to that described and shown in the above-cited copending application in that the piston 52 is provided with a central bore 74 which communicates with a blind central bore 76 in the piston rod 54 when the pressure on the bottom of the piston 52 is great enough to raise a ball valve 78 biased against the upper end of the central bore 74 by a spring 80 captively mounted in a compressed condition within the blind bore 76. The piston 52 is also provided with a plurality of bores 82 extending therethrough from its bottom to its top surface and communicating with the central bore 74 by respective horizontal passages 84. In the position shown in FIG. 1 the bores 82 are closed by a flat ring valve 86 covering the bottom ends of the bores 82 whenever pressure below the piston is substantially greater than pressure above the piston due to downward motion of the piston 52 within the cylinder 50. The valve 86 is free to move downwardly with respect to the bottom of the piston 52 a limited distance and prevented from moving farther in the axial direction with respect to the piston 52 by a suitable snap ring 88 mounted on a downwardly extending cylindrical portion of the piston 52 as described in the above cited copending application.

Figure 1:
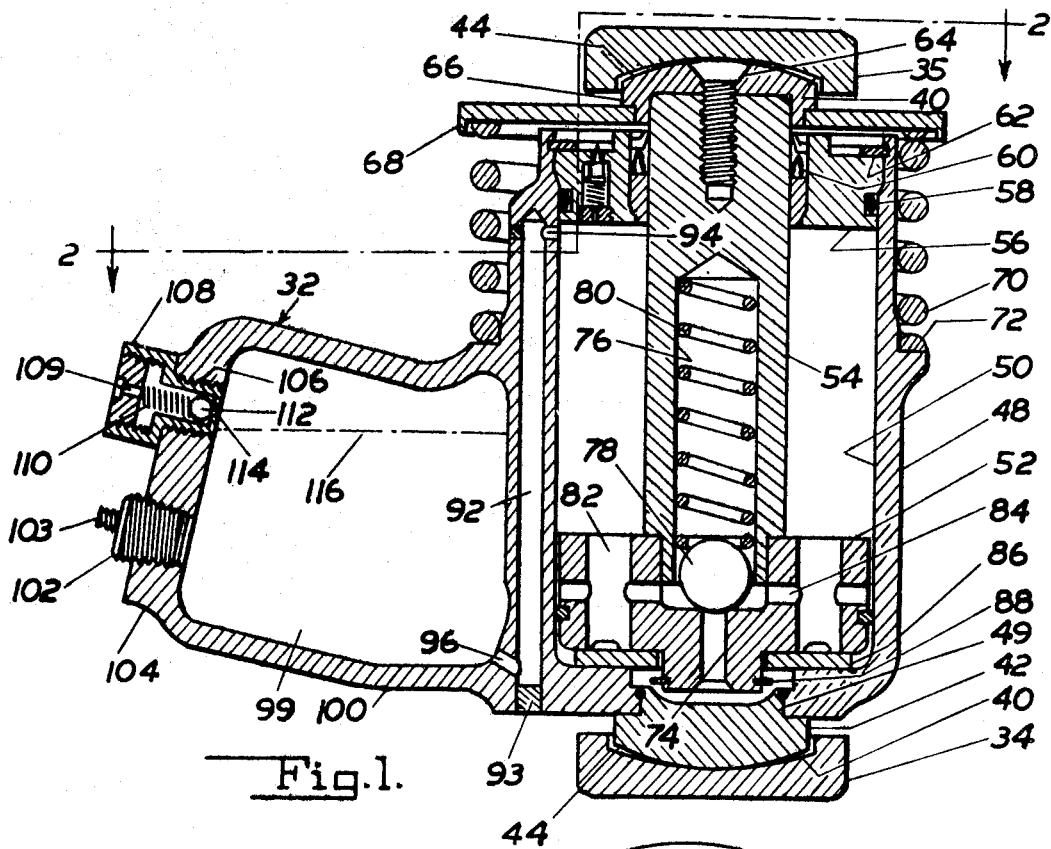
FIG. 1 is a median sectional view of a snubber constructed according to the principles of this invention.
Figure 2:
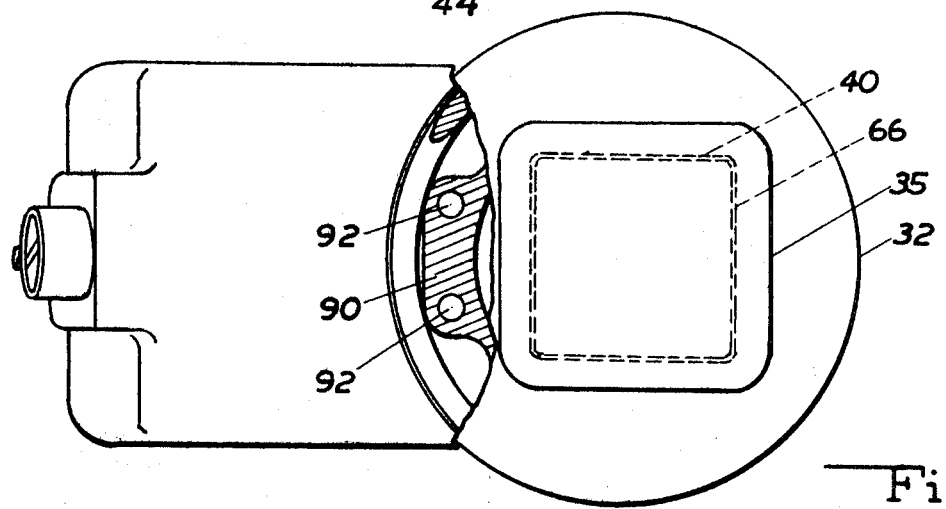
FIG. 2 is a partially sectional view of the snubber of FIG. 1 taken substantially on line 2–2 of FIG. 1.

The body member 48 has a thick wall portion 90 (see FIG. 2) extending from the bottom of the body member 48 up to an area slightly above the bottom surface of the cylinder closure member 56 (as best seen in FIG. 1). Within the wall portion 90 is formed a pair of passageways such as elongated bores 92 having axes parallel to the axis of the cylinder 50 and extending within the wall portion 90 from the bottom of the body member 48 nearly to the top of the thick portion 90 at least as far up as the bottom surface of the cylinder closure member 56. At a point just below the bottom surface of the cylinder closure member 56 horizontal passageways 94 communicate between the interior of the cylinder 50 and the passageways 92, respectively. Similar substantially horizontal passageways 96 communicate between lower end portions of the bores 92 and the interior space 99 of a generally rectangular, substantially horizontally extending reservoir or hollow tank element 100 formed as a lateral extension of the body member 48 secured to or formed integral with the lower half of the body member 48. The bottom ends of the bores 92 are sealed by plugs 93 so that the interior space 99 communicates with the cylinder 50 through the passageways 96, 92 and 94 with the result that hydraulic liquid within the cylinder 50 can be displaced outwardly into the interior space 99 of the tank element 100 or caused to flow in the opposite direction as hereinafter more fully described.

The tank element 100 is provided with a threaded hollow plug 102 suitably threadedly engaged in a filler opening in the lower portion of an outer end member 104 of the tank element 100 and having a suitable check valved connection 103 thereon to provide for filling the interior of the tank element 100 with liquid by the application of a suitable pressurized fluid conducting element (not shown) to the valve fitting 103 in a well known manner. A second threaded bore 106 communicates with an upper portion of the interior of the tank element 100 and has threadedly engaged therein an adjustable valve 108 provided with an internally threaded stepped bore 114 in which is engaged an adjusting element 109 cap securing a spring 110 biasing a ball value 112 into engagement with a smaller portion of the bore 114 which communicates between the upper portion of the inner chamber of the tank element 100 and the ambient atmosphere. The adjusting element 109 is suitably adjusted so that the ball valve 112 will remain seated and prevent communication between the interior of the tank element 100 and the ambient atmosphere until the pressure within the interior space 99 of tank element 100 exceeds that of the ambient atmosphere by at least a preselected amount, preferably approximately 2—5 atmospheres in the present embodiment.

OPERATION

With the above described snubber 32 fully assembled and in the upright position as shown in FIG. 1 but with the piston rod 54 fully extended and the piston 52 abutting the bottom surface of the cylinder head 56 a suitable liquid having the requisite physical and chemical characteristics for use as a pressure transfer medium within an hydraulic cylinder is pumped into the space 99 through the connection 103 until compression of the air within the space 99, the bores 92 and the cylinder 50 produces a pressure of approximately five atmospheres. Under such pressure the air within the communicating spaces 99, 92 and 50 will be compressed to approximately one-fifth its original volume with approximately four-fifths of the tanks space 99 and the cylinder 50 being filled with liquid so that the liquid in the tank reaches a level approximately that indicated by a horizontal line 116 across the space 99 (see FIG. 1). The stepped bore 114 is suitably located so that its inner end portion communicating with the space 99 determines the level 116 so that liquid flows out of the bore 114 when the tank is being filled and whenever the pressure within the space 99 overcomes the spring 110 at the pressure for which the valve 108 has been set. The level 116 must be far enough above the level of bores 96 so that the bores 96 are always submerged under operating conditions.

When the piston rod 54 is pushed downwardly into the cylinder 50 the piston 52 travels downwardly with the valve 86 open as long as the downward motion of the piston 52 is slow enough to avoid substantial pressure differential between the upper and lower sides of the piston 52 so that liquid below the piston can flow upward through the bores 82 into the space within the cylinder 50 above the piston 52. During the inward motion of the piston rod 54 liquid and air must be displaced from the cylinder 50 because of the volume occupied by the increased portion of the piston rod 54 within the cylinder 50 (displacement volume). With a newly filled snubber 32 approximately one-fifth of the space within the cylinder 50 will be occupied by air which, because of gravitational effect, will be accumulated at the top of the cylinder 50 so that displacement of the piston rod volume will increase the air pressure within the cylinder and force air in the top of the cylinder 50 to travel outwardly through the passages 94, downwardly through the bores 92, horizontally outwardly through the passages 96 into the space 99 where the air will rise in the form of bubbles through the liquid in the space 99 to become part of the trapped air volume above the level 116 within the space 99.

When the piston rod 54 again moves upwardly within the cylinder 50, removal of a portion of the volume of the rod 54 from the interior of cylinder 50 provides space for more oil within the cylinder 50 and this amount of liquid will be supplied by liquid from the space 99 flowing through the passages 96, upwardly through the bores 92, and horizontally inwardly through the passages 94, into the cylinder 50. Successive up and down motions of the piston rod 54 will thus cause an exchange of air in the cylinder 50 and oil in the space 99 until the cylinder 50 is completely filled with oil.

It is to be noted that the combined cross-sectional area of the bores 92 or equivalent passageway means must be large enough to allow free flow of liquid therethrough (no orifice effect). Furthermore the total volume of such passageway or bores 92 must be small enough so that normal rod movement into cylinder 50 to within an inch of fully closed will displace more than enough liquid to completely fill the bores 92. Or vice versa this amount of liquid must flow into the cylinder during rod extension to originally displace the air and thereafter to keep the cylinder full of liquid at all times.

It is to be appreciated that without the tank element 100 and the communicating passageways as hereinabove described it has always been necessary in prior art snubbers to provide at least some liquid free space or ullage volume at the top of the cylinder so that displacement of liquid by the piston rod entering the cylinder would not cause unwanted overpressuring of the cylinder 50 with resultant damage to the sealing elements and unacceptable loss of the hydraulic fluid.

Because of the transfer of ullage volume in the present invention from the top of the cylinder 50 to the top of the space 99 the snubber 32 of this invention is usable throughout the total length of piston stroke since the piston is always completely covered by and filled with the hydraulic liquid and no space need be left empty at the top of the cylinder as was necessary in prior art snubbers.

The minimum volume unfilled by liquid within the space 99 above the level 116 (hereinafter the ullage volume) should not be less than approximately 150 percent of the volume of that portion of the piston rod which moves into and out of the cylinder 50 below the cylinder head 56 (hereinafter the displacement volume), to avoid overpressuring the snubber at full stroke, and to avoid preventing the flow of the air which has been pressurized in the top of the cylinder 50 through the passageways 94 and 96 and the bores 92. This ullage volume in the reservoir is preferably 3 to 4 times the volume of the bores 92 and the communicating passageways 94 and 96 with the passageways of a diameter to allow free flow of liquid with very little pressure drop. This ratio of volumes has been found to be great enough to give free volume above the level 116 sufficient to permit displacement of the column of liquid in the bores 92 to provide for purging of air from the bores 92 into the space 99. Thus the volume of the bores 92 must always be less than one-half the total piston rod displacement volume so that flow of air from the bores 92 into the space 99 will not be prevented by compressibility of the air.

Operation of the snubber 32 of this invention is in all respects the same as that described for the snubber of the above cited copending application except for the flow of liquid into and out of the cylinder 50 and the space 99 as hereinabove described. Such operation of course includes the "dead band operation" and the free flow of oil through the piston 52 during slow downward movement of the piston 52 within the cylinder 50 as well as the high pressure energy absorbing flow of oil through the passageway 74 in the piston 52 past the ball valve 78 after compression of spring 80, during rapid downward movement of the piston 52 which closes the valve 86, all as described with relation to the side frame snubber of the above cited application.

The determination of the proper radii R1 for the concave surfaces 40 and R2 for the convex surfaces 44 (See FIG. 5) is based on the moduli of elasticity of the two contacting surface materials, the force per unit length of the cylindrical surfaces against each other, the coefficient of dry static friction of the two surfaces relative to each other, the necessity for a center seeking characteristic without slipping of the two contacting surfaces and the necessity to avoid metal failure from overstressing the materials of the contact surfaces. With all of these factors taken into consideration a standard height snubber varying from 14 inches full extension to 9¾ inches fully compressed in the installed condition and with a limit of approximately ½ inches of relative motion to right and left of the vertical position shown in FIG. 1 it is found that the value of R1 must be in the range of 8 inches to 5 inches and that the ratio of R1 to R2 must be in the range of 1.2 through 1.7 with a preferred value of 1.55 as the ratio of R1 to R2.

It is to be noted that the higher ratios of the radii result in higher contact stresses while smaller radii improve center seeking. The above stated values represent a compromise based on these considerations.

Referring again to FIG. 5 the usable area portion on either side of the center line of the contacting surfaces is represented by the dimension W for the maximum usable width of the surface 40 in one direction from the center line. This value is determined by the product of R1 and the coefficient of dry static friction (approximately 0.3 ) between the contact surfaces so that the maximum usable width of the surface 40 is equal to 2W or approximately 3 inches for the more usable range of radius values. Since the horizontal cross section of the elements 34 and 35 is approximately square the length of the surface 40 in an axial direction will be of the order of 2 to 3 inches.

Figure 6:
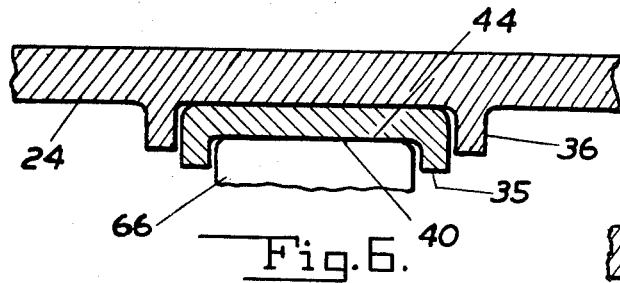
FIG. 6 is a fragmentary partially sectional view taken as on line 6–6 of FIG. 3.

FIG. 6 is a medial section taken lengthwise of the side frame 24 as on line 6–6 of FIG. 3 through the surfaces 40 and 44 of the upper mounting element 35 and the snubber top member 66, respectively, normal to the view as seen in FIG. 1 showing that in this view surfaces 40 and 44 are flat. These surfaces can, if desired, be made flat since the relative motion of the bolster and side frame in forward and back direction is much less than that in the transverse direction with respect to the car 10.

Figure 7:
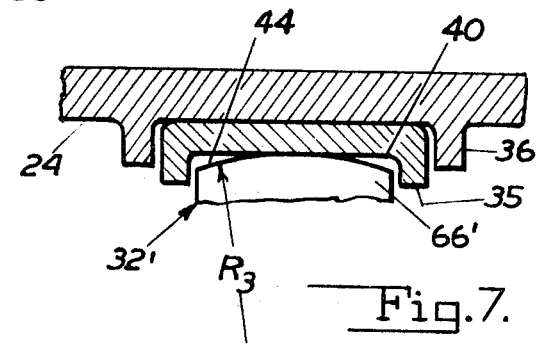
FIG. 7 is a view similar to FIG. 6 showing a second embodiment of the principles of this invention.

FIG. 7 is a view similar to FIG. 6 but shows a second embodiment of the principles of this invention wherein a snubber 32', in all other respects similar to the snubber 32 of the fist embodiment, is provided with a snubber top member 66' with a double curved top surface 44', having the same curvature transversely of the car as the surface 44 of the top member 6, wherein the top surface 44' is similarly curved in a direction lengthwise of the car 10 and has a radius indicated as R3 with values in the range of 10 to 25 inches. The bottom surface (not shown) can be similarly double curved. The advantage of the second embodiment over the first embodiment resides, of course in the double curvature of the surface 44' reducing the possibility of overstressing corner areas of the upper mounting element 35 when forward or backward relative motion, between the bolster 20 and the side frame 24 occurs.

Figure 8:
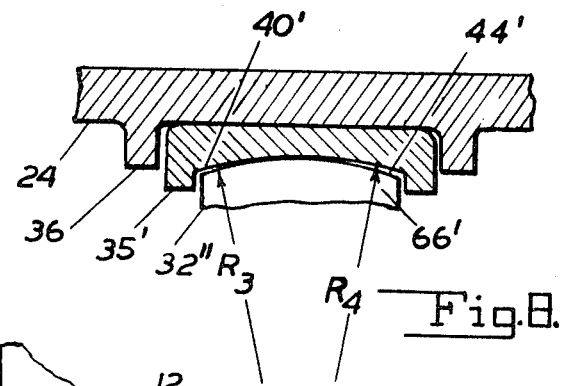
FIG. 8 is a view similar to FIG. 6 showing a third embodiment of the principles of this invention.

FIG. 8 is a view similar to FIG. 6 showing a portion of a third embodiment of the principles of this invention in a snubber 32" entirely similar to the first and second embodiments excepting only that while employing the snubber top member 66' of the second embodiment with the double curved surface 44' as above described the third embodiment snubber 32' has an upper mounting element 35' also provided with a double curved surface 40' having the curvature of the surface 40 in the direction transverse to the car 10 but having an additional curvature on a radius R4 in the direction lengthwise of the side frame 24. With such double curvature the range of values for the curve having radius R3 remains the same as for the second embodiment with the ratio of R4 to R3 having a value of 1.1— 1.3 to provide for low contact stress despite rocking motion in the forward and backward direction and still have radii small enough to provide center seeking action without slip as described for the motion in the transverse direction relative to the car 10.

Preferred embodiments of the principles of this invention having hereinbefore been described it is to be realized that variations in the structure embodying the principles of this invention are possible without departing from the scope of such principles. It is therefore respectfully requested that this invention be interpreted as broadly as possible and limited only by the scope of the claims appended hereto.

I claim:

1. A snubber device in which a pair of elongated members are telescopically movable along a longitudinal axis thereof with a pair of end portions thereof respectively engageable with a mating pair of opposed portions of separate members cyclically movable with respect to each other to cause simultaneous movement of said elongated members along and transversely of said axis, the improvement comprising; one pair of said portions having convex surfaces, the other pair of said portions having concave surfaces engageable by said convex surfaces, respectively, and each said concave surface having a radius of curvature greater than the radius of curvature of the mating one of said convex surfaces with the ratio of said radii being in the range of ratios from 1.2 to 1.7 to provide a center seeking snubbing device.

2. A snubbing device as set forth in claim 1 wherein said one pair of said portions are said end portions.

3. A snubbing device as set forth in claim 1 wherein said one pair of said portions are said mating pair of opposed portions.

4. A snubbing device as set forth in claim 1 wherein the outermost portion of said convex surfaces is contained in a plane extending in the direction of and containing said longitudinal axis.

5. A snubbing device as specified in claim 4 wherein at least when said longitudinal axis is perpendicular with respect to the innermost portion of said concave surface, said innermost portion of said concave surface is contained in said plane.

6. A snubbing device as set forth in claim 1 wherein the innermost portion of said concave surfaces is contained in a plane extending in the direction of and containing said longitudinal axis.

7. A snubbing device as specified in claim 6 wherein, at least when said longitudinal axis is perpendicular with respect to the innermost portion of said convex surface, said innermost portion of said convex surface is contained in said plane.

8. A snubber device as set forth in claim 1 in which said convex surfaces have another radius of curvature determining an arc which extends in a direction generally transverse to the arc determined by said first mentioned radius of curvature of said convex surfaces.

9. A snubber device as set forth in claim 8 in which said concave surfaces have another radius of curvature which extends in a direction generally transverse to the arc determined by said first mentioned radius of curvature of said concave surfaces and said another radius of curvature of said concave surfaces is greater than said another radius of curvature of said convex surfaces with the ratio of said latter mentioned radii being from 1.1 to 1.3.